US011372590B2

(12) United States Patent
Lai (10) Patent No.: US 11,372,590 B2
(45) Date of Patent: Jun. 28, 2022

(54) MEMORY CONTROL METHOD, MEMORY STORAGE DEVICE AND MEMORY CONTROL CIRCUIT UNIT

(71) Applicant: PHISON ELECTRONICS CORP., Miaoli (TW)

(72) Inventor: Chia-Hsiung Lai, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/105,521

(22) Filed: Nov. 26, 2020

(65) Prior Publication Data

US 2022/0137877 A1   May 5, 2022

(30) Foreign Application Priority Data

Oct. 30, 2020   (TW) .................................. 109137757

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| 2002/0027731 | A1* | 3/2002 | Arakawa | ............ | G11B 20/1217 360/60 |
| 2008/0123420 | A1* | 5/2008 | Brandman | .......... | G11C 11/5642 365/185.09 |
| 2009/0241010 | A1* | 9/2009 | Yano | .................... | G06F 11/1072 714/764 |
| 2012/0317463 | A1* | 12/2012 | Sugahara | .............. | H03M 13/05 714/785 |
| 2013/0159815 | A1* | 6/2013 | Jung | ........................ | G06F 12/00 714/763 |
| 2016/0224419 | A1* | 8/2016 | Takai | .................... | G06F 3/0679 |
| 2018/0374550 | A1* | 12/2018 | Barndt | .................. | G06F 3/0656 |

FOREIGN PATENT DOCUMENTS

| TW | 201618114 | 5/2016 |
| TW | 202008171 | 2/2020 |

OTHER PUBLICATIONS

"Office Action of Taiwan Counterpart Application", dated Oct. 6, 2021, p. 1-p. 8.

* cited by examiner

*Primary Examiner* — Ryan Bertram
*Assistant Examiner* — Cody J Farlow
(74) *Attorney, Agent, or Firm* — JCIPRNET (57) ABSTRACT

A memory control method for a memory storage device is provided according to an exemplary embodiment of the disclosure. The method includes: reading first data from a first physical unit in response to a first read command from a host system; performing a first decoding operation on the first data to obtain decoded data corresponding to the first data; storing the decoded data corresponding to the first data in a buffer memory; reading second data from the first physical unit in response to a second read command from the host system; performing a second decoding operation on the second data; and in response to failure of the second decoding operation, searching the buffer memory for the decoded data corresponding to the first data to replace the reading of the second data.

18 Claims, 8 Drawing Sheets

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 109137757, filed on Oct. 30, 2020. The entirety of the above-mentioned patent application is hereby incorporated by reference herein and made a part of this specification.

BACKGROUND

Technical Field

The invention relates to a memory control technique, and more particularly, to a memory control method, a memory storage device and a memory control circuit unit.

Description of Related Art

The markets of digital cameras, cellular phones, and MP3 players have expanded rapidly in recent years, resulting in consumers' escalated demand for storage media. The characteristics of data non-volatility, low power consumption, compact size and no mechanical structure make a rewritable non-volatile memory module (e.g., flash memory) ideal to be built in the portable multi-media devices as cited above.

Generally speaking, there may be an error in the data read from a rewritable non-volatile memory module. The error can be corrected by an error checking and correcting circuit. However, if error correction is performed on the read data every time the data is read, the overall read performance of the memory storage device will decrease. Particularly, for a memory storage device that has come to the later stage of its service life, the number of errors in the data read each time may be large. Performing each decoding completely may severely reduce the overall read performance of the memory storage device.

Regarding the above problem, some types of memory storage devices further support the caching of corrected data. Once a piece of data is corrected, the corrected data can be temporarily stored in a buffer memory. When the same data is read next time, the memory storage device will first search the buffer memory for the data. If the data is in the buffer memory, the memory storage device can directly read the data from the buffer memory, so that the obtained data can be directly transmitted to the host system without any decoding operation. However, this mechanism has a problem that if the data to be read is not in the buffer memory and/or the data read does not actually have any error (or has only a few errors), searching the buffer memory first every time the data is read will take extra reading time; what is more, after spending extra time searching the buffer memory, it may still be required to read the data from the rewritable non-volatile memory module to decode it again, which will take more time. Therefore, how to strike a balance between meeting the data decoding requirements and increasing the data reading speed is an issue that needs to be addressed for those skilled in the art.

SUMMARY

The invention provides a memory control method, a memory storage device and a memory control circuit unit, which increase the data reading speed as much as possible while meeting the data decoding requirements.

An exemplary embodiment of the invention provides a memory control method for a memory storage device. The memory storage device includes a buffer memory and a rewritable non-volatile memory module. The rewritable non-volatile memory module includes a plurality of physical units. The memory control method includes: reading first data from a first physical unit of the plurality of physical units in response to a first read command from a host system; performing a first decoding operation on the first data to obtain decoded data corresponding to the first data; storing the decoded data corresponding to the first data in the buffer memory; reading second data from the first physical unit in response to a second read command from the host system; performing a second decoding operation on the second data; and searching the buffer memory for the decoded data corresponding to the first data to replace reading of the second data in response to failure of the second decoding operation.

An exemplary embodiment of the invention further provides a memory storage device, which includes a connection interface unit, a rewritable non-volatile memory module, and a memory control circuit unit. The connection interface unit is coupled to a host system. The rewritable non-volatile memory module includes a plurality of physical units. The memory control circuit unit is coupled to the connection interface unit and the rewritable non-volatile memory module. The memory control circuit unit is configured to send a first read command sequence, which instructs to read first data from a first physical unit of the plurality of physical units, in response to a first read command from the host system. The memory control circuit unit is further configured to perform a first decoding operation on the first data to obtain decoded data corresponding to the first data. The memory control circuit unit is further configured to store the decoded data corresponding to the first data in a buffer memory. The memory control circuit unit is further configured to send a second read command sequence, which instructs to read second data from the first physical unit, in response to a second read command from the host system. The memory control circuit unit is further configured to perform a second decoding operation on the second data. The memory control circuit unit is further configured to search the buffer memory for the decoded data corresponding to the first data to replace reading of the second data in response to failure of the second decoding operation.

An exemplary embodiment of the invention further provides a memory control circuit unit configured to control a rewritable non-volatile memory module. The rewritable non-volatile memory module includes a plurality of physical units. The memory control circuit unit includes a host interface, a memory interface, a buffer memory, a decoding circuit and a memory management circuit. The host interface is coupled to a host system. The memory interface is coupled to the rewritable non-volatile memory module. The memory management circuit is coupled to the host interface, the memory interface, the buffer memory and the decoding circuit. The memory management circuit is configured to send a first read command sequence, which instructs to read first data from a first physical unit of the plurality of physical units, in response to a first read command from the host system. The decoding circuit is configured to perform a first decoding operation on the first data to obtain decoded data corresponding to the first data. The memory management circuit is further configured to store the decoded data corresponding to the first data in the buffer memory. The memory management circuit is further configured to send a second read command sequence, which instructs to read second data from the first physical unit, in response to a second read command from the host system. The decoding circuit is further configured to perform a second decoding operation on the second data. The memory management circuit is further configured to search the buffer memory for the decoded data corresponding to the first data to replace reading of the second data in response to failure of the second decoding operation.

Based on the above, after the first data is read from the first physical unit in response to the first read command from the host system, the first decoding operation is performed on the first data to obtain the decoded data corresponding to the first data, and the decoded data is stored in the buffer memory. Thereafter, in response to the second read command from the host system, the second data is read from the first physical unit and the second decoding operation is performed on the second data. If the second decoding operation fails, the buffer memory is searched for the decoded data corresponding to the first data so as to replace the reading of the second data. In this way, the data reading speed can be increased as much as possible while meeting the data decoding requirements.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

DESCRIPTION OF THE EMBODIMENTS

Reference will now be made in detail to the exemplary embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

In general, a memory storage device (a.k.a. a memory storage system) includes a rewritable non-volatile memory module and a controller (a.k.a. a control circuit). The memory storage device usually operates together with a host system so that the host system can write data into the memory storage device or read data from the memory storage device.

Figure 1:
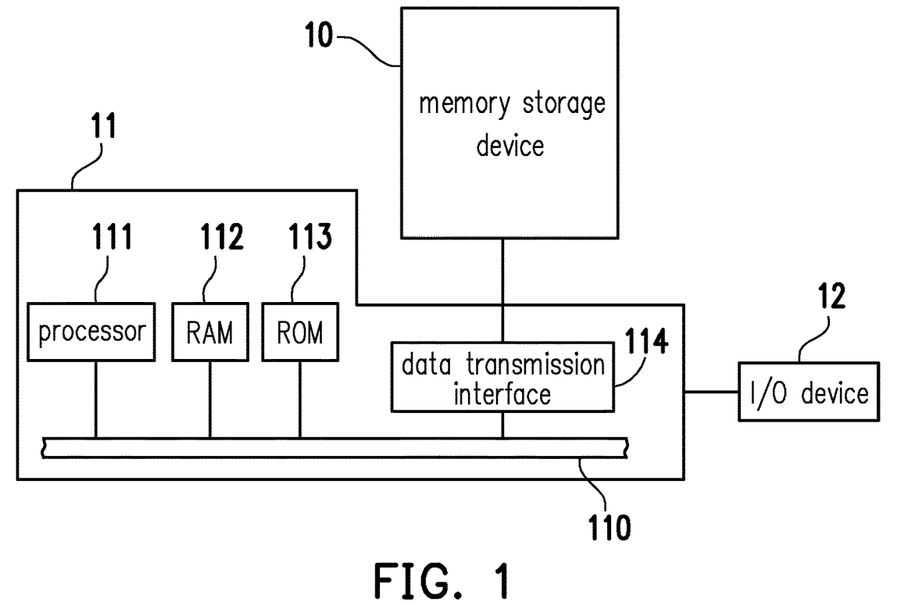
FIG. 1 is a schematic diagram illustrating a host system, a memory storage device and an I/O (input/output) device according to an exemplary embodiment of the invention.
Figure 2:
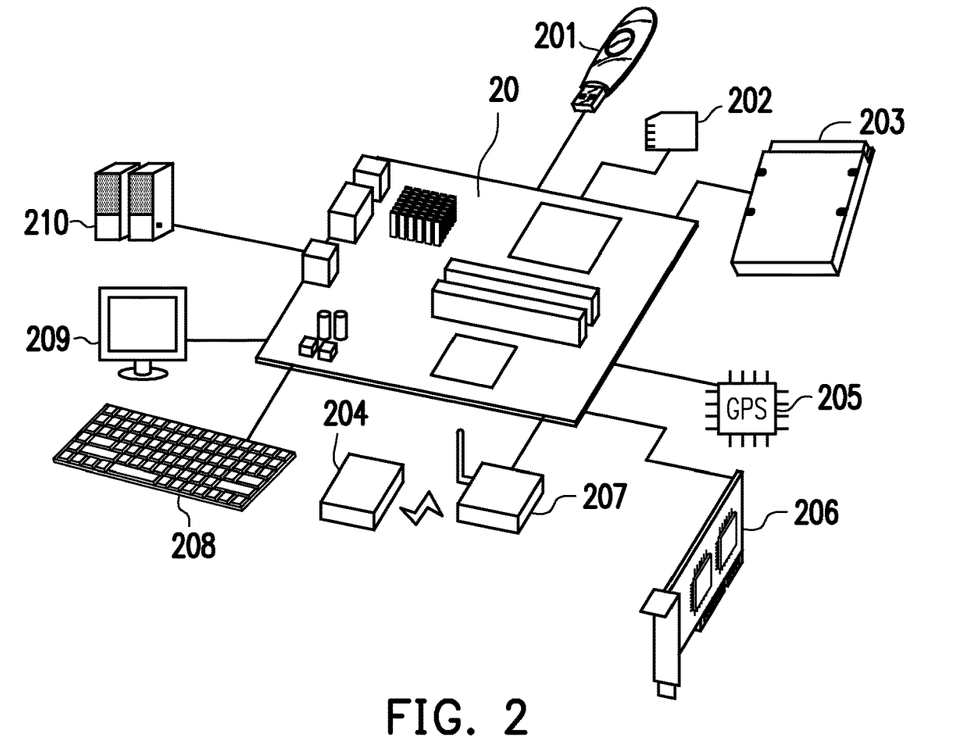
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interfaces 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device and a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
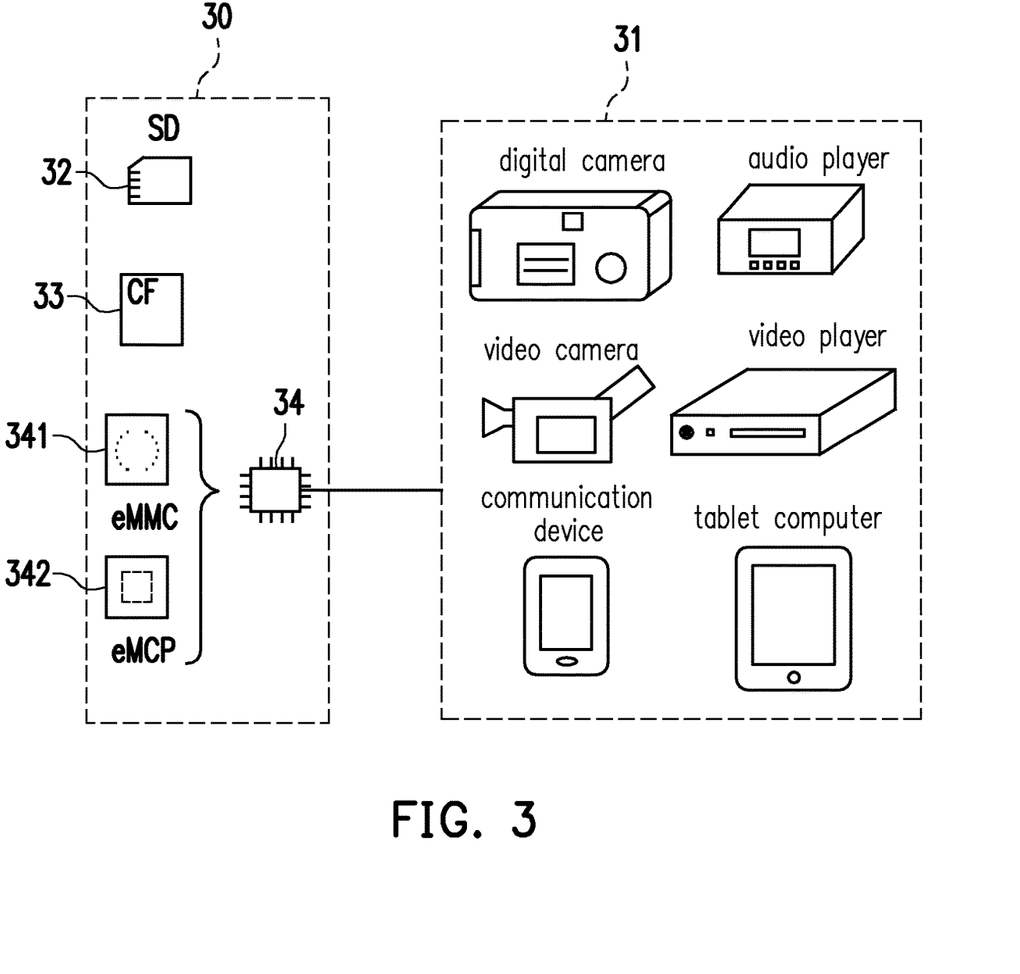
FIG. 3 is a schematic diagram illustrating a host system and a memory storage device according to another exemplary embodiment of the invention.

In an exemplary embodiment, the aforementioned host system may be any system capable of substantially cooperating with the memory storage device for storing data. The host system is illustrated as a computer system in the foregoing exemplary embodiment. Nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
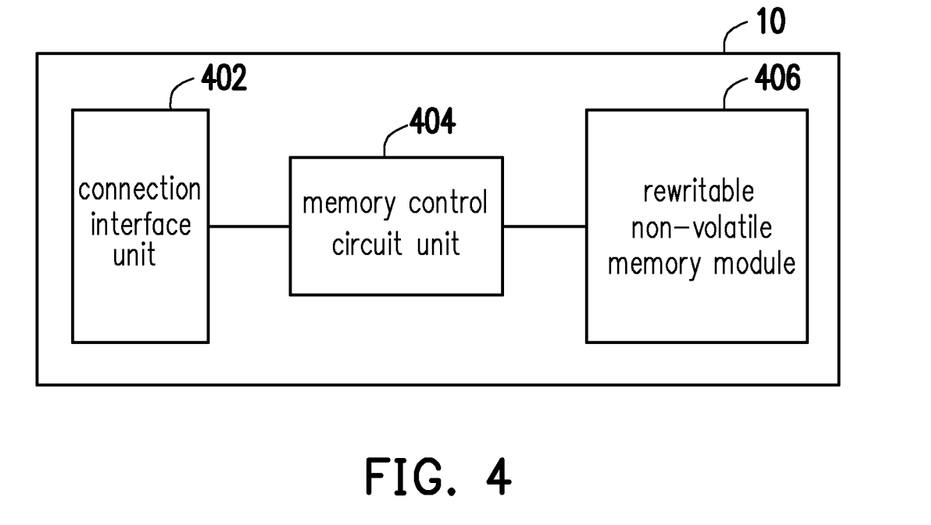
FIG. 4 is a schematic block diagram illustrating a memory storage device according to an exemplary embodiment of the invention.

FIG. 4 is a schematic block diagram illustrating a memory storage device according to an exemplary embodiment of the invention. Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the invention is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading and erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also referred to as a threshold voltage) of each of the memory cells. More specifically, in each of the memory cells, a charge trapping layer is provided between a control gate and a channel. The amount of electrons in the charge trapping layer may be changed by applying a write voltage to the control gate, thereby changing the threshold voltage of the memory cell. This operation of changing the threshold voltage of the memory cell is also referred to as "writing data into the memory cell" or "programming the memory cell". With the change in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundancy bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8 or 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
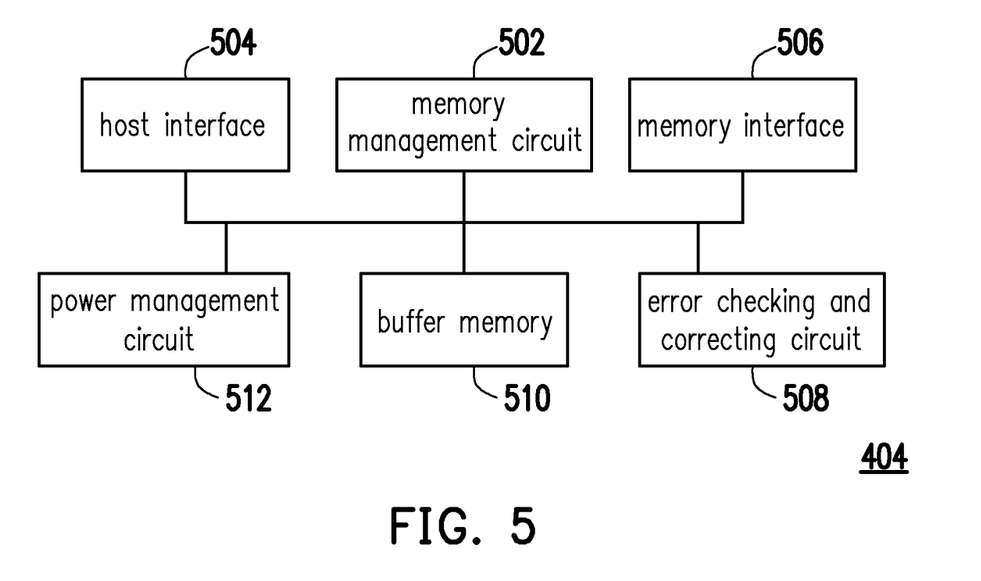
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention. Referring to FIG. 5, the memory control circuit unit 404 includes a memory management circuit 502, a host interface 504, a memory interface 506, an error checking and correcting circuit 508 and a buffer memory 510.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. When the memory storage device 10 operates, the control commands are executed by the microprocessor unit to perform operations of writing, reading and erasing data.

In another exemplary embodiment, the control commands of the memory management circuit 502 may also be stored as program codes in a specific area (e.g., the system area in the memory module exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations of writing, reading and erasing data.

Further, in another exemplary embodiment, the control commands of the memory management circuit 502 may also be implemented in form of hardware. For example, the memory management circuit 502 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage the memory cells or a memory cell group of the rewritable non-volatile memory module 406. The memory writing circuit is configured to issue a write command sequence to the rewritable non-volatile memory module 406 to write data into the rewritable non-volatile memory module 406. The memory reading circuit is configured to issue a read command sequence to the rewritable non-volatile memory module 406 to read data from the rewritable non-volatile memory module 406. The memory erasing circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequences of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the invention is not limited in this regard. The host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends the corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data on the bus. The signals or the data may include command codes and program codes. For example, information such as identification codes and memory addresses is included in the read command sequence.

The error checking and correcting circuit (a.k.a. a decoding circuit) 508 is coupled to the memory management circuit 502 and configured to execute an error checking and correcting operation to ensure the correctness of data. Specifically, when the memory management circuit 502 receives the write command from the host system 11, the error checking and correcting circuit 508 generates an error correcting code (ECC) and/or an error detecting code (EDC) for data corresponding to the write command, and the memory management circuit 502 writes data corresponding to the write command and the corresponding ECC and/or EDC to the rewritable non-volatile memory module 406. Then, when the memory management circuit 502 reads the data from the rewritable non-volatile memory module 406, the corresponding ECC and/or EDC are also read, and the error checking and correcting circuit 508 executes the error checking and correcting operation on the read data based on the ECC and/or the EDC.

The buffer memory 510 is coupled to the memory management circuit 502 and configured to temporarily store the data and commands from the host system 11 or the data from the rewritable non-volatile memory module 406.

In an exemplary embodiment, the memory control circuit unit 404 further includes a power management circuit 512. The power management unit 512 is coupled to the memory management circuit 502 and configured to control a power of the memory storage device 10.

In an exemplary embodiment, the rewritable non-volatile memory module 406 of FIG. 4 is also known as a flash memory module, and the memory control circuit unit 404 is also known as a flash memory controller for controlling the flash memory module, and/or the memory management circuit 502 of FIG. 5 is also known as a flash memory management circuit.

Figure 6:
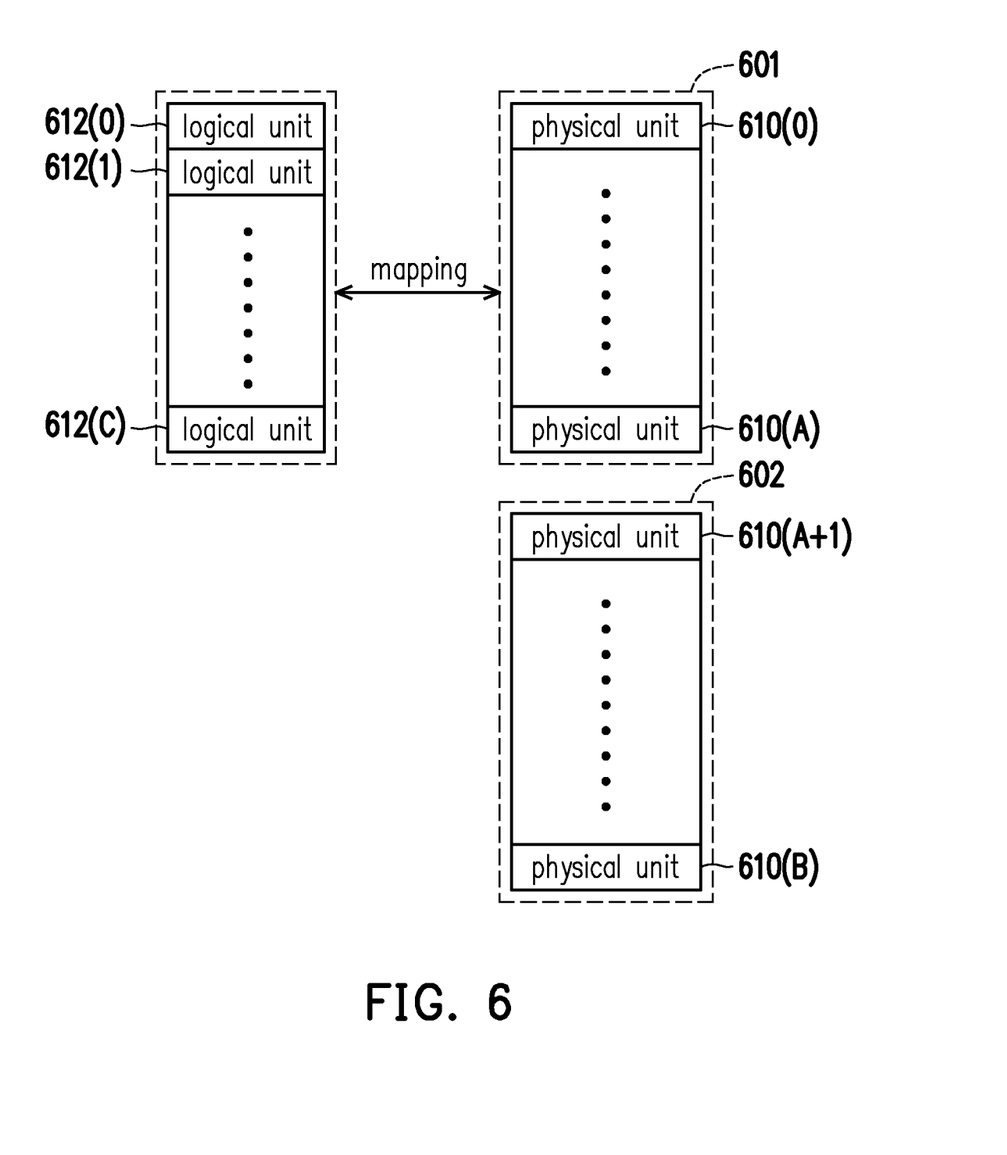
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. Referring to FIG. 6, the memory management circuit 502 can logically group physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. In addition, if there are no available physical erasing units in the replacement area 602, the memory management circuit 502 may declare the entire memory storage device 10 as in a write protect state so that data can no longer be written thereto.

In this exemplary embodiment, each physical unit refers to one physical programming unit. However, in another exemplary embodiment, one physical unit may also refer to one physical address, one physical erasing unit, or a composition of a plurality of continuous or discontinuous physical addresses. The memory management circuit 502 assigns logical units 612(0) to 612(C) for mapping to the physical units 610(0) to 610(A) in the storage area 601. In this exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 can record a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can perform a data accessing operation on the memory storage device 10 according to the logical-physical address mapping table.

In an exemplary embodiment, the memory management circuit 502 receives a read command (also referred to as a first read command) from the host system 11. The first read command may instruct to read data belonging to a certain logical unit (also referred to as a first logical unit). The first logical unit is, for example, the logical unit 612(0) of FIG. 6. In response to the first read command, the memory management circuit 502 sends a read command sequence (also referred to as a first read command sequence) to the rewritable non-volatile memory module 406. The first read command sequence instructs to read data from a certain physical unit (also referred to as a first physical unit) mapped by the first logical unit. According to the first read command sequence, the rewritable non-volatile memory module 406 may read data (also referred to as first data) from the first physical unit and return the first data to the memory management circuit 502.

After obtaining the first data, the error checking and correcting circuit 508 performs a decoding operation (also referred to as a first decoding operation) on the first data to obtain decoded data corresponding to the first data. For example, in the first decoding operation, the error checking and correcting circuit 508 may correct possible errors in the first data and generate the decoded data corresponding to the first data. In other words, the decoded data corresponding to the first data is generated by the first decoding operation. Then, the memory management circuit 502 stores the decoded data corresponding to the first data into the buffer memory 510.

In an exemplary embodiment, the memory management circuit 502 divides a specific storage space in the buffer memory 510. The memory management circuit 502 may temporarily store the decoded data (and other decoded data) corresponding to the first data in the specific storage space. In an exemplary embodiment, the specific storage space is also called an error buffer area.

In an exemplary embodiment, the memory management circuit 502 receives another read command (also referred to as a second read command) from the host system 11. The second read command may instruct to read data belonging to a certain logical unit. Here, it is assumed that the first read command and the second read command instruct to read data belonging to the same logical unit (i.e., the first logical unit). In response to the second read command, the memory management circuit 502 sends a read command sequence (also referred to as a second read command sequence) to the rewritable non-volatile memory module 406. The second read command sequence instructs to read data from the physical unit (i.e., the first physical unit) mapped by the first logical unit. According to the second read command sequence, the rewritable non-volatile memory module 406 may read data (also referred to as second data) from the first physical unit and return the second data to the memory management circuit 502. Then, the error checking and correcting circuit 508 performs a decoding operation (also referred to as a second decoding operation) on the second data. In the second decoding operation, the error checking and correcting circuit 508 may try to correct possible errors in the second data.

In an exemplary embodiment, if the error checking and correcting circuit 508 successfully corrects all possible errors in the second data in the second decoding operation, the memory management circuit 502 determines that the decoding is successful (that is, the second decoding operation is successful). In another exemplary embodiment, if the error checking and correcting circuit 508 cannot successfully correct all possible errors in the second data in the second decoding operation, the memory management circuit 502 determines that the decoding fails (that is, the second decoding operation fails).

In an exemplary embodiment, it is assumed that the second decoding operation fails. In response to the failure of the second decoding operation, the memory management circuit 502 searches the buffer memory 510 for the decoded data corresponding to the first data to replace the reading of the second data. For example, the memory management circuit 502 may search the error buffer area in the buffer memory 510 and determine whether the error buffer area includes decoded data belonging to the same logical unit (i.e., the first logical unit).

In an exemplary embodiment, if the search result reflects that the buffer memory 510 includes decoded data (e.g., decoded data corresponding to the first data) belonging to the same logical unit (i.e., the first logical unit), the memory management circuit 502 reads the decoded data from the buffer memory 510 (e.g., the error buffer area) and send the decoded data to the host system 11 in response to the second read command.

Generally speaking, the time taken to read data from the physical unit (including decoding the read data) is longer than the time taken to read data directly from the buffer memory 510. Therefore, after the second decoding operation fails, if the retry read of the first physical unit can be skipped and the decoded data belonging to the same logical unit (i.e., the data instructed by the second read command) can be directly obtained from the buffer memory 510, the overall data reading speed of the memory storage device 10 can be improved.

In an exemplary embodiment, if the search result reflects that the buffer memory 510 does not include decoded data belonging to the same logical unit (i.e., the first logical unit), it means that the required data (i.e., the data instructed by the second read command) cannot be directly read from the buffer memory 510 at this time. In this case, the memory management circuit 502 may perform a retry read operation on the first physical unit. For example, in the retry read operation, the memory management circuit 502 may adjust the read voltage level for reading data and send the read command sequence to the rewritable non-volatile memory module 406 so as to instruct the rewritable non-volatile memory module 406 to use the adjusted read voltage level to read data from the first physical unit again. The rewritable non-volatile memory module 406 may return the data (also referred to as third data) read from the first physical unit through the retry read operation to the memory management circuit 502.

After obtaining the third data, the error checking and correcting circuit 508 performs a decoding operation (also referred to as a third decoding operation) on the third data to obtain decoded data corresponding to the third data. For example, in the third decoding operation, the error checking and correcting circuit 508 may correct possible errors in the third data and generate decoded data corresponding to the third data. Then, the memory management circuit 502 sends the decoded data corresponding to the third data to the host system 11 in response to the second read command.

In an exemplary embodiment, the memory management circuit 502 may also store the decoded data corresponding to the third data in the buffer memory 510 (for example, in the error buffer area). Thereafter, if a read command (also referred to as a third read command) instructing to read data from the same logical unit (i.e., the first logical unit) is received again and the read data fails to be decoded at least one time, the decoded data corresponding to the third data is directly obtained from the buffer memory 510 instead and sent to the host system 11 in response to the third read command.

In an exemplary embodiment, if the second decoding operation is successful, the memory management circuit 502 may directly output the successfully decoded second data (for example, send the successfully decoded second data to the host system 11 in response to the second read command) without searching the buffer memory 510. In other words, in an exemplary embodiment, the search of the buffer memory 510 is only performed after the second decoding operation fails and is used to replace the retry read of the specific physical unit (e.g., the first physical unit).

In an exemplary embodiment, after reading data from the specific physical unit (e.g., the first physical unit) according to the read command from the host system 11, preliminary decoding may be performed on the currently read data. The preliminary decoding does not include the retry read operation for the specific physical unit. If the data can be successfully decoded quickly (for example, there are fewer errors in the data so the data can be corrected quickly), then the decoded data can also be quickly output, and the influence on the efficiency of data reading is small or even negligible.

However, if the preliminary decoding fails (for example, there are too many errors in the data so the data cannot be corrected quickly), then the buffer memory 510 is searched for substitute decoded data. For example, if a certain read command instructs to read data belonging to a certain logical unit (e.g., the first logical unit), the decoded data in the buffer memory 510 that also belongs to this logical unit (e.g., the first logical unit) can be used to replace the data in response to the host system. Compared with the conventional technique that has to perform time-consuming data retry read and decoding when the decoding fails, using the decoded data in the buffer memory 510 to replace the retry read of the data effectively improves the data reading efficiency.

Figure 7:
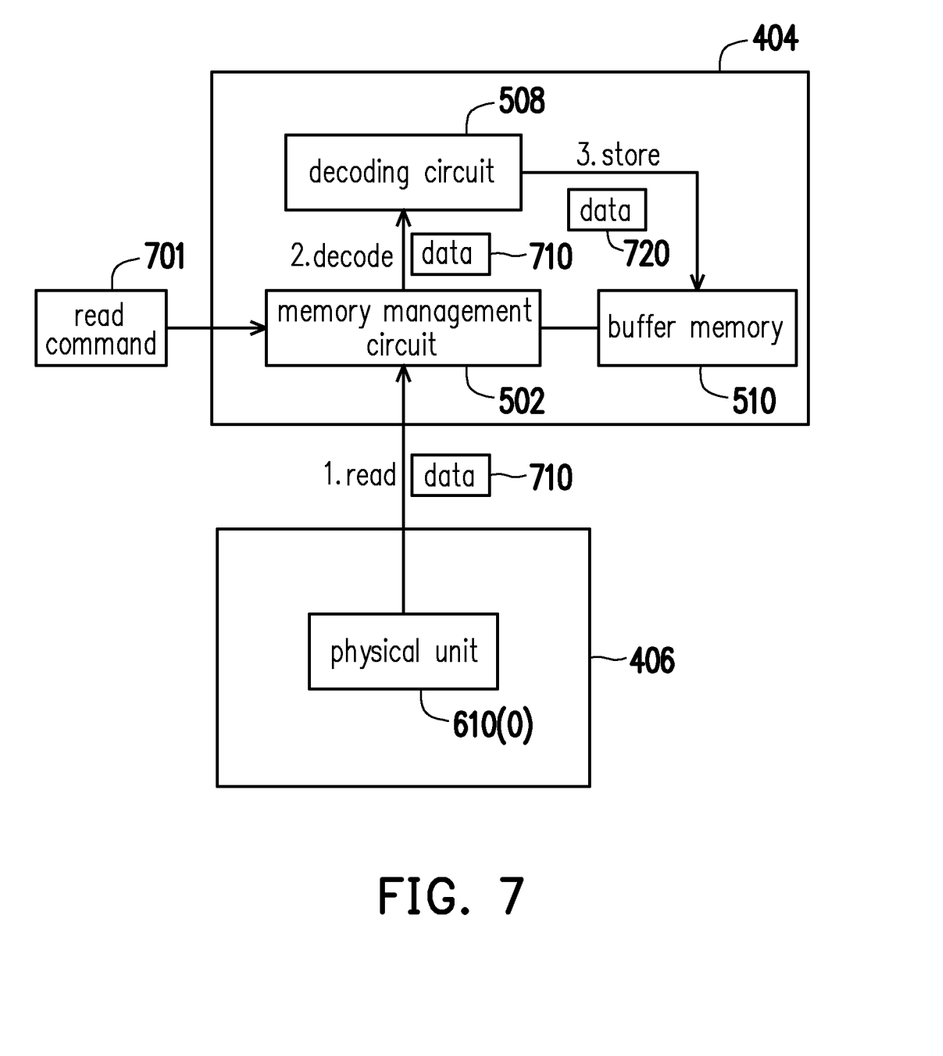
FIG. 7 to FIG. 9 are schematic diagrams illustrating data processing operations after a read command is received in different situations according to exemplary embodiments of the invention.
Figure 8:
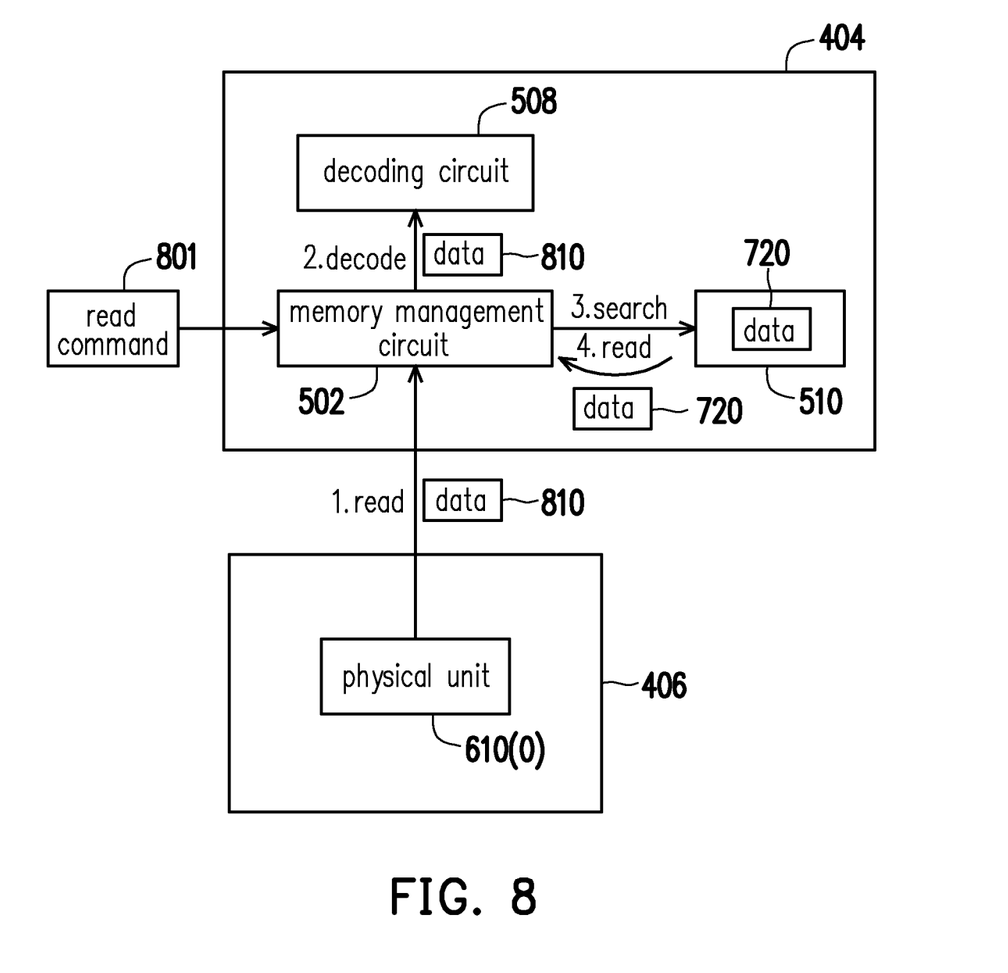
Figure 9:
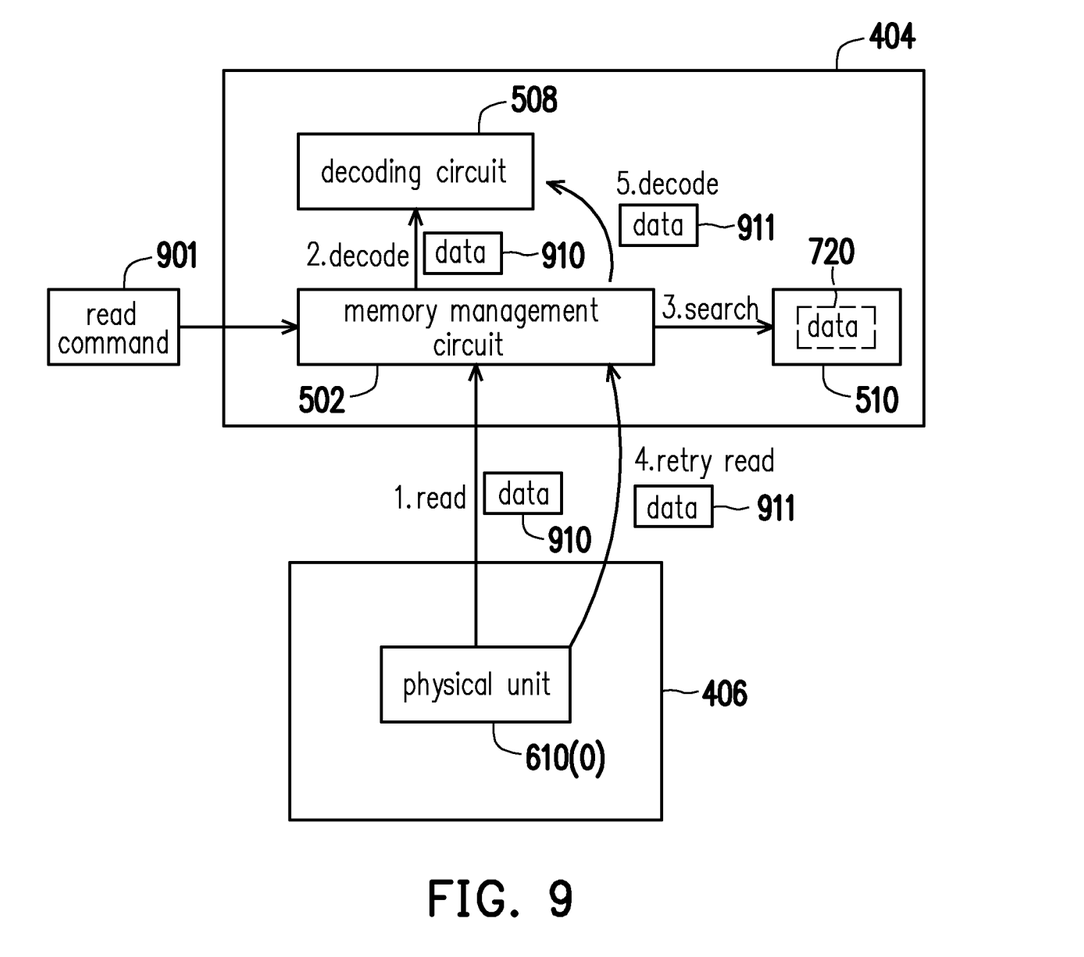

FIG. 7 to FIG. 9 are schematic diagrams illustrating data processing operations after a read command is received in different situations according to exemplary embodiments of the invention. Referring to FIG. 7, in an exemplary embodiment, after receiving the read command 701 (i.e., the first read command) from the host system 11, the memory management circuit 502 reads the data 710 (i.e., the first data) from the physical unit 610(0) (i.e., the first physical unit) in the rewritable non-volatile memory module 406 according to the read command 701. For example, the physical unit 610(0) is mapped to the logical unit (i.e., the first logical unit) that the read command 701 instructs to read.

Then, the memory management circuit 502 instructs the decoding circuit 508 to perform a decoding operation (i.e., the first decoding operation) to decode the data 710 and stores the data 720 generated by decoding the data 710 in the buffer memory 510. It should be noted that the data 720 is the decoded data corresponding to the data 710. In addition, the memory management circuit 502 sends the data 720 to the host system 11 in response to the read command 701.

Referring to FIG. 8, FIG. 8 is schematic diagrams illustrating data processing operations after a read command is received according to exemplary embodiments of the invention, in an exemplary embodiment, after receiving the read command 801 (i.e., the second read command) from the host system 11, the memory management circuit 502 reads the data 810 (i.e., the second data) from the physical unit 610(0) in the rewritable non-volatile memory module 406 according to the read command 801. Then, the memory management circuit 502 instructs the decoding circuit 508 to perform a decoding operation (i.e., the second decoding operation) to decode the data 810.

It should be noted that in this exemplary embodiment, it is assumed that the decoding operation of the data 810 fails and that the data instructed to be read by the read command 801 and the data instructed to be read by the read command 701 in FIG. 7 use the same logical unit (i.e., the first logical unit). In response to the failure of the decoding operation of the data 810, the memory management circuit 502 searches the buffer memory 510 for decoded data that uses the same logical unit. According to the search result, the memory management circuit 502 reads the data 720 from the buffer memory 510. The read data 720 can be used to replace the data 810 and sent to the host system 11 in response to the read command 801. In addition, the data 720 is decoded data so the data 720 can be directly sent to the host system 11 without being decoded.

Referring to FIG. 9, in an exemplary embodiment, after receiving the read command 901 (i.e., the second read command) from the host system 11, the memory management circuit 502 reads the data 910 (i.e., the second data) from the physical unit 610(0) in the rewritable non-volatile memory module 406 according to the read command 901. Then, the memory management circuit 502 instructs the decoding circuit 508 to perform a decoding operation (i.e., the second decoding operation) to decode the data 910. In this exemplary embodiment, it is also assumed that the decoding operation of the data 910 fails. In response to the failure of the decoding operation of the data 910, the memory management circuit 502 searches the buffer memory 510 for the decoded data that uses the same logical unit.

It should be noted that in this exemplary embodiment, it is assumed that the buffer memory 510 does not include any decoded data (e.g., the data 720) that uses the same logical unit as the data instructed to be read by the read command 901. Therefore, the memory management circuit 502 cannot obtain decoded data that can be used to replace the data 910 from the buffer memory 510. In this case, the memory management circuit 502 continues to perform a retry read operation on the physical unit 610(0) to read the data 911 (i.e., the third data) from the physical unit 610(0). For example, in the retry read operation, the read voltage level used to read the data 911 may be different from the read voltage level previously used to read the data 910 so as to reduce the number of error bits in the data 911. Then, the memory management circuit 502 instructs the decoding circuit 508 to perform a decoding operation (i.e., the third decoding operation) to decode the data 911 and sends the decoded data generated by decoding the data 911 to the host system 11 in response to the read command 901. In an exemplary embodiment, the memory management circuit 502 also stores the decoded data generated by decoding the data 911 in the buffer memory 510 for subsequent use.

Figure 10:
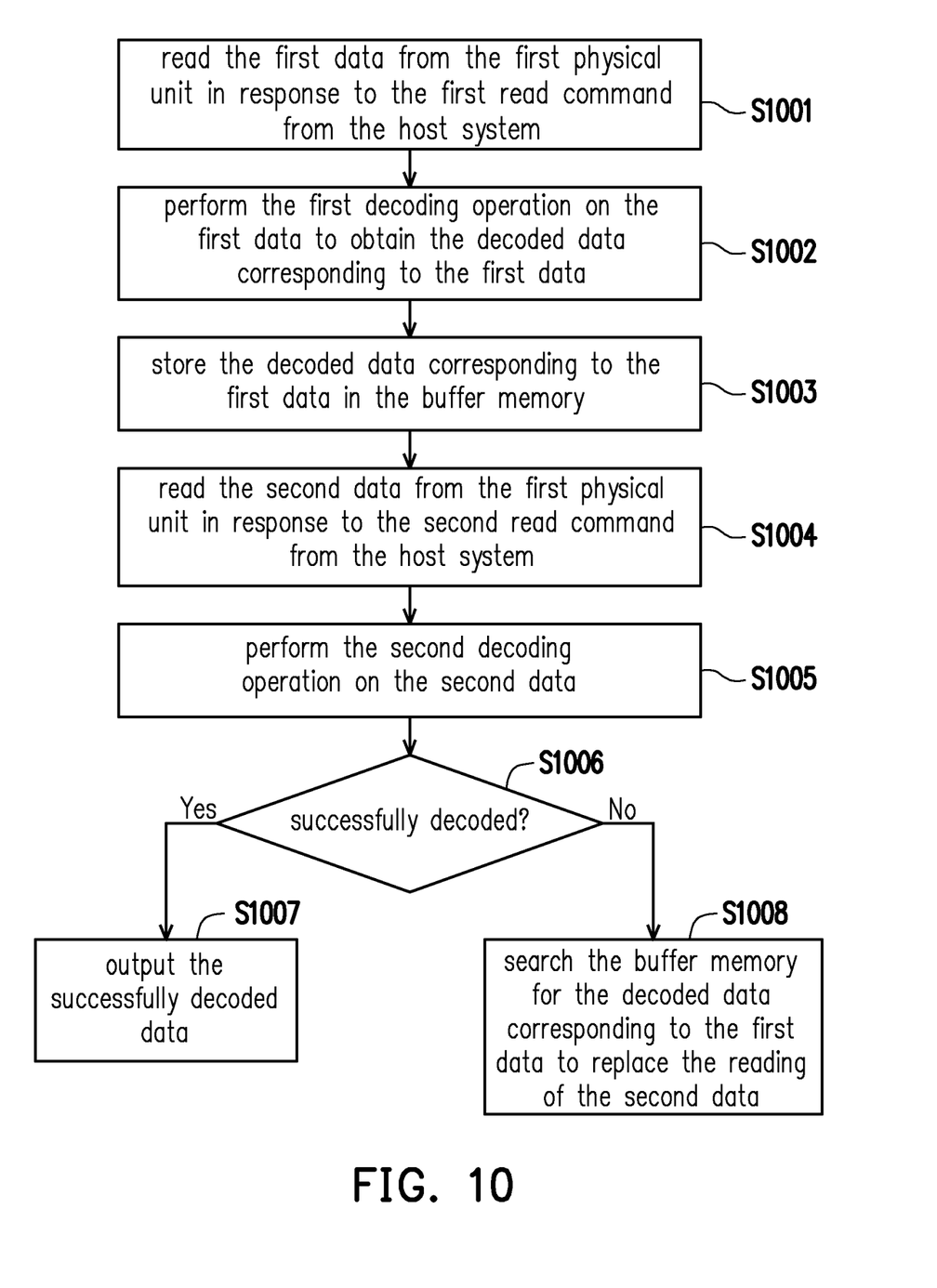
FIG. 10 is a flowchart illustrating a memory control method according to an exemplary embodiment of the invention.

FIG. 10 is a flowchart illustrating a memory control method according to an exemplary embodiment of the invention. Referring to FIG. 10, in step S1001, the first data is read from the first physical unit in response to the first read command from the host system. In step S1002, the first decoding operation is performed on the first data to obtain the decoded data corresponding to the first data. In step S1003, the decoded data corresponding to the first data is stored in the buffer memory. In step S1004, the second data is read from the first physical unit in response to the second read command from the host system. In step S1005, the second decoding operation is performed on the second data. In step S1006, whether the second decoding operation is successful is determined. If the second decoding operation is successful, in step S1007, in response to the second decoding operation being successful, the successfully decoded data is output. If the second decoding operation fails, in step S1008, in response to the failure of the second decoding operation, the buffer memory is searched for the decoded data corresponding to the first data to replace the reading of the second data.

Each step in FIG. 10 has been described in detail as above, and will not be repeated here. It should be noted that each step in FIG. 10 can be implemented as multiple program codes or circuits, and the invention is not limited in this regard. In addition, the method in FIG. 10 may be used in combination with the above exemplary embodiments or be used alone, and the invention is not limited in this regard.

In summary, according to the exemplary embodiments of the invention, whether to search the buffer memory for the decoded data that uses the same logical unit is determined according to the preliminary decoding result of the read data. In this way, the data reading speed can be increased as much as possible while meeting the data decoding requirements.

The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory control method for a memory storage device, which comprises a buffer memory and a rewritable non-volatile memory module that comprises a plurality of physical units, the memory control method comprising:
   reading first data from a first physical unit of the plurality of physical units in response to a first read command from a host system;
   performing a first decoding operation on the first data to obtain decoded data corresponding to the first data;
   storing the decoded data corresponding to the first data in the buffer memory;
   reading second data from the first physical unit in response to a second read command from the host system;
   performing a second decoding operation on the second data; and
   searching the buffer memory for the decoded data corresponding to the first data to replace reading of the second data in response to failure of the second decoding operation.

2. The memory control method according to claim 1, further comprising:
   outputting successfully decoded second data without searching the buffer memory in response to the second decoding operation being successful.

3. The memory control method according to claim 1, further comprising:
   after searching for the decoded data corresponding to the first data, performing a retry read operation on the first physical unit in response to the decoded data corresponding to the first data being unable to be obtained from the buffer memory.

4. The memory control method according to claim 3, further comprising:
   performing a third decoding operation on third data obtained through the retry read operation to obtain decoded data corresponding to the third data; and storing the decoded data corresponding to the third data in the buffer memory.

5. The memory control method according to claim 1, further comprising:
after obtaining the decoded data corresponding to the first data from the buffer memory, sending the decoded data corresponding to the first data to the host system in response to the second read command.

6. The memory control method according to claim 1, wherein the first data and the second data use a same logical unit.

7. A memory storage device, comprising:
a connection interface unit coupled to a host system;
a rewritable non-volatile memory module comprising a plurality of physical units; and
a memory control circuit unit coupled to the connection interface unit and the rewritable non-volatile memory module,
wherein the memory control circuit unit is configured to send a first read command sequence, which instructs to read first data from a first physical unit of the plurality of physical units, in response to a first read command from the host system,
the memory control circuit unit is further configured to perform a first decoding operation on the first data to obtain decoded data corresponding to the first data,
the memory control circuit unit is further configured to store the decoded data corresponding to the first data in a buffer memory,
the memory control circuit unit is further configured to send a second read command sequence, which instructs to read second data from the first physical unit, in response to a second read command from the host system,
the memory control circuit unit is further configured to perform a second decoding operation on the second data, and
the memory control circuit unit is further configured to search the buffer memory for the decoded data corresponding to the first data to replace reading of the second data in response to failure of the second decoding operation.

8. The memory storage device according to claim 7, wherein the memory control circuit unit is further configured to output successfully decoded second data without searching the buffer memory in response to the second decoding operation being successful.

9. The memory storage device according to claim 7, wherein the memory control circuit unit is further configured to perform a retry read operation on the first physical unit after searching for the decoded data corresponding to the first data in response to the decoded data corresponding to the first data being unable to be obtained from the buffer memory.

10. The memory storage device according to claim 9, wherein the memory control circuit unit is further configured to perform a third decoding operation on third data obtained through the retry read operation to obtain decoded data corresponding to the third data, and
the memory control circuit unit is further configured to store the decoded data corresponding to the third data in the buffer memory.

11. The memory storage device according to claim 7, wherein the memory control circuit unit is further configured to send the decoded data corresponding to the first data to the host system in response to the second read command after obtaining the decoded data corresponding to the first data from the buffer memory.

12. The memory storage device according to claim 7, wherein the first data and the second data use a same logical unit.

13. A memory control circuit unit configured to control a rewritable non-volatile memory module comprising a plurality of physical units, the memory control circuit unit comprising:
a host interface coupled to a host system;
a memory interface coupled to the rewritable non-volatile memory module;
a buffer memory;
a decoding circuit; and
a memory management circuit coupled to the host interface, the memory interface, the buffer memory and the decoding circuit,
wherein the memory management circuit is configured to send a first read command sequence, which instructs to read first data from a first physical unit of the plurality of physical units, in response to a first read command from the host system,
the decoding circuit is configured to perform a first decoding operation on the first data to obtain decoded data corresponding to the first data,
the memory management circuit is further configured to store the decoded data corresponding to the first data in the buffer memory,
the memory management circuit is further configured to send a second read command sequence, which instructs to read second data from the first physical unit, in response to a second read command from the host system,
the decoding circuit is further configured to perform a second decoding operation on the second data, and
the memory management circuit is further configured to search the buffer memory for the decoded data corresponding to the first data to replace reading of the second data in response to failure of the second decoding operation.

14. The memory control circuit unit according to claim 13, wherein the memory management circuit is further configured to output successfully decoded second data without searching the buffer memory in response to the second decoding operation being successful.

15. The memory control circuit unit according to claim 13, wherein the memory management circuit is further configured to perform a retry read operation on the first physical unit after searching for the decoded data corresponding to the first data in response to the decoded data corresponding to the first data being unable to be obtained from the buffer memory.

16. The memory control circuit unit according to claim 15, wherein the decoding circuit is further configured to perform a third decoding operation on third data obtained through the retry read operation to obtain decoded data corresponding to the third data, and
the memory management circuit is further configured to store the decoded data corresponding to the third data in the buffer memory.

17. The memory control circuit unit according to claim 13, wherein the memory management circuit is further configured to send the decoded data corresponding to the first data to the host system in response to the second read command after obtaining the decoded data corresponding to the first data from the buffer memory.

18. The memory control circuit unit according to claim 13, wherein the first data and the second data use a same logical unit.

\* \* \* \* \*